United States Patent
Chang (10) Patent No.: US 10,263,490 B2
(45) Date of Patent: Apr. 16, 2019

(54) APPARATUS AND METHOD FOR FIXING POWER LINE TERMINAL IN MOTOR

(71) Applicant: HYUNDAI MOBIS CO., LTD., Seoul (KR)

(72) Inventor: Seok-Young Chang, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 332 days.

(21) Appl. No.: 14/813,922

(22) Filed: Jul. 30, 2015

(65) Prior Publication Data
US 2016/0036290 A1 Feb. 4, 2016

(30) Foreign Application Priority Data

Aug. 4, 2014 (KR) .......................... 10-2014-0099808

(51) Int. Cl.
*H01R 9/18* (2006.01)
*H02K 5/22* (2006.01)
*H02K 15/00* (2006.01)

(52) U.S. Cl.
CPC .............. *H02K 5/225* (2013.01); *H01R 9/18* (2013.01); *H02K 15/0062* (2013.01); *H02K 15/0068* (2013.01)

(58) Field of Classification Search
CPC ...... H02K 5/22; H02K 5/225; H02K 15/0062; H02K 15/0068; H01R 9/16; H01R 9/18
USPC ............... 310/71; 439/625, 733.1, 737, 801; 411/81, 103
See application file for complete search history.

(56) References Cited

U.S. PATENT DOCUMENTS

| | | | | |
|---|---|---|---|---|
| 6,361,382 B1* | 3/2002 | Yamada | ................. | H01R 4/302 439/801 |
| 8,251,756 B2* | 8/2012 | Matsuoka | ................ | H01R 9/18 439/737 |
| 2006/0049706 A1* | 3/2006 | Kashihara | ................ | H02K 5/00 310/91 |
| 2010/0273362 A1 | 10/2010 | Matsuoka | | |
| 2012/0238147 A1* | 9/2012 | Matsumoto | ............. | H01M 2/20 439/660 |

FOREIGN PATENT DOCUMENTS

| | | |
|---|---|---|
| JP | 5-18258 U | 3/1993 |
| JP | 2002-125348 A | 4/2002 |
| JP | 2003-72390 A | 3/2003 |
| JP | 2011-4523 A | 1/2011 |
| JP | 2011-4526 A | 1/2011 |
| KR | 10-2013-0132320 A | 12/2013 |

* cited by examiner

*Primary Examiner* — Quyen P Leung
*Assistant Examiner* — Minki Chang
(74) *Attorney, Agent, or Firm* — NSIP Law (57) ABSTRACT

An apparatus for fixing a power line terminal may include a terminal guide configured to be mounted at one end of a motor cover to support a motor coil terminal and to have an upper surface provided with a plurality of insertion grooves, and a plurality of insert nuts configured to be inserted into the plurality of insertion grooves, the insert nuts manufactured separate from the terminal guide.

20 Claims, 7 Drawing Sheets

APPARATUS AND METHOD FOR FIXING POWER LINE TERMINAL IN MOTOR

CROSS-REFERENCE(S) TO RELATED APPLICATIONS

This application claims the benefit under 35 USC 119(a) of Korean Patent Application No(s). 10-2014-0099808 filed on Aug. 4, 2014 in the Korean Intellectual Property Office, the entire disclosure of which is incorporated herein by reference in its entirety.

BACKGROUND

1. Field

Embodiments of the present application relate to an apparatus and a method for fixing a power line terminal in a motor capable of manufacturing a motor terminal guide without an injection hole, separately inserting an insert nut, and pressing the insert nut with a bus bar of a three-phase connector to prevent the insert nut from being separated from of the motor terminal guide.

2. Description of Related Art

Figure 1:
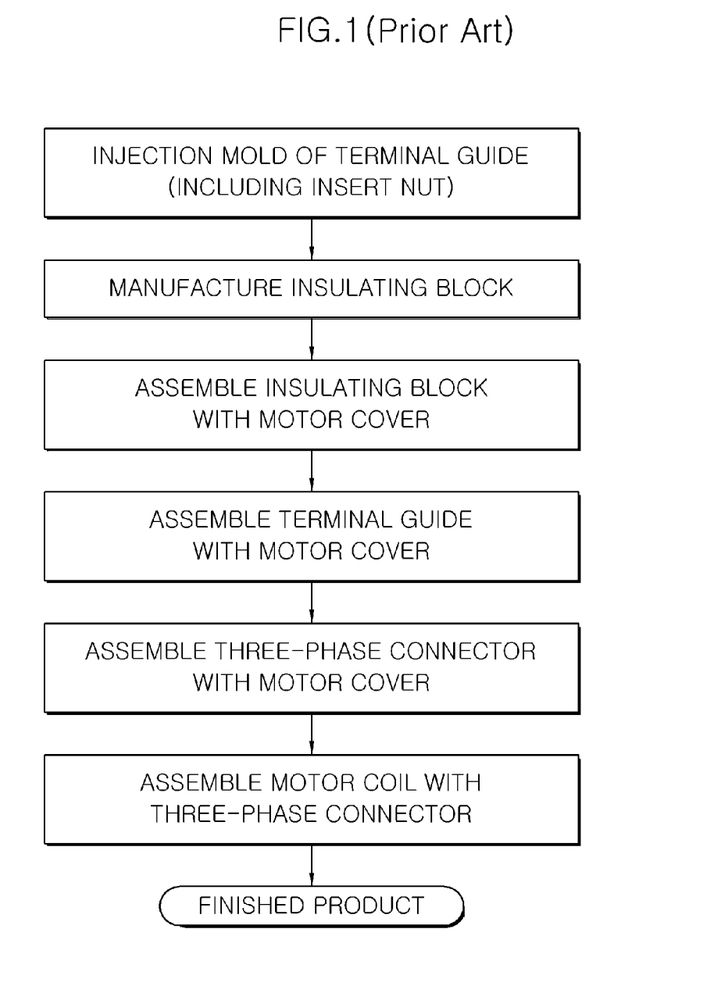
FIG. 1 is a flow chart illustrating an example of a method for fixing a motor terminal according to the related art.
Figure 2:
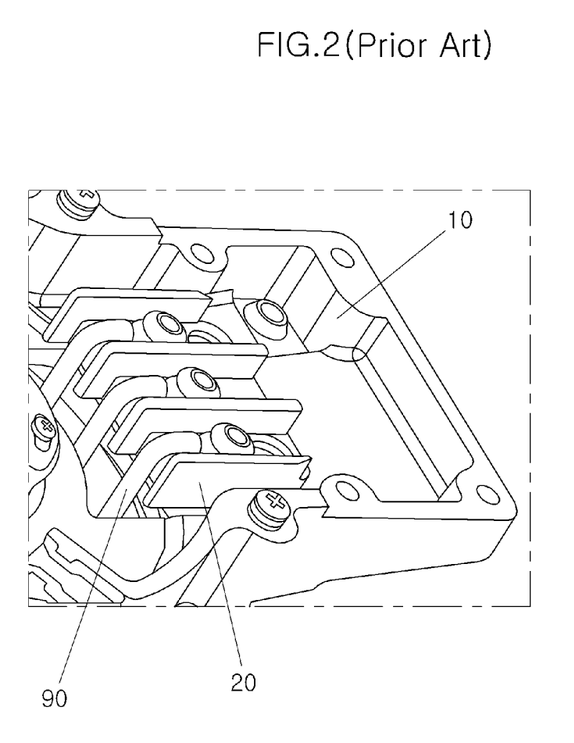
FIG. 2 is a perspective view illustrating an example of an insulating structure of a power line terminal mounted on a Hybrid Starter Generator (HSG) motor cover according to the related art.
Figure 3A:
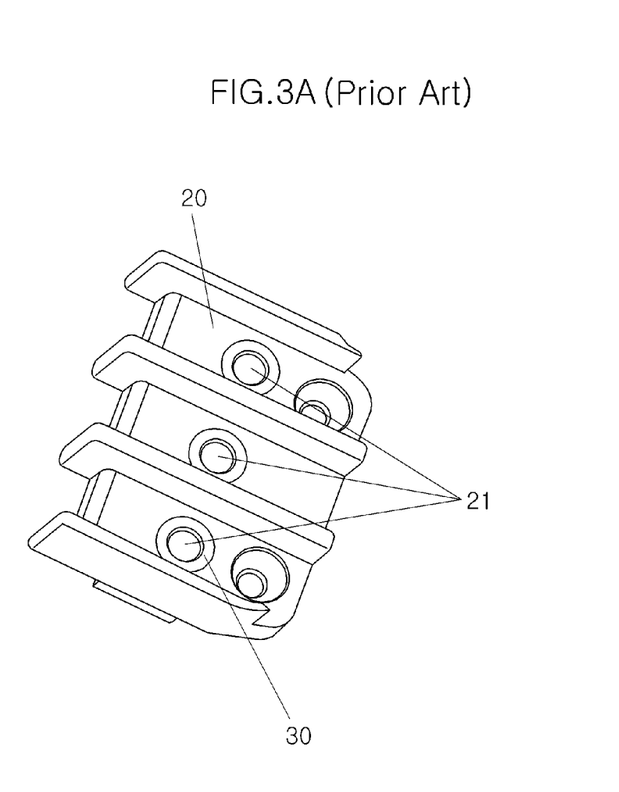
FIGS. 3A and 3B are, respectively, a perspective view illustrating an example of a front surface of a terminal guide of an insulating structure of a power line terminal according to the related art, and a perspective view illustrating a rear surface thereof.
Figure 3B:
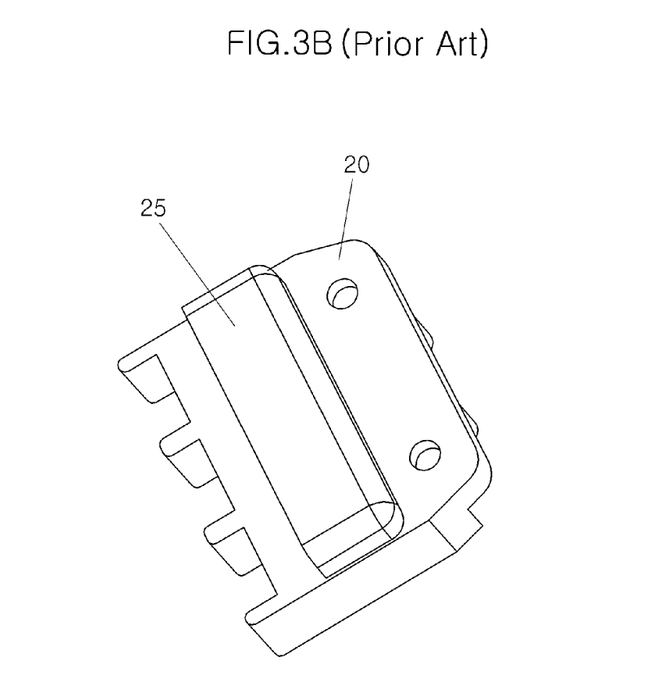
Figure 4:
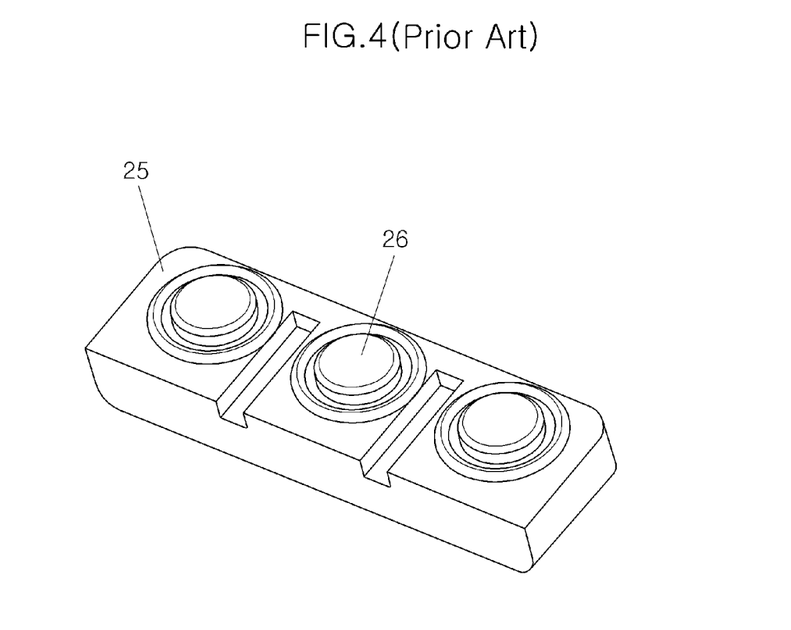
FIG. 4 is a perspective view illustrating an example of an insulating block of an insulating structure of a power line terminal according to the related art.

FIG. 1 is a flow chart illustrating an example of a method for fixing a motor terminal according to the related art. FIG. 2 is a perspective view illustrating an example of an insulating structure of a power line terminal mounted on a Hybrid Starter Generator (HSG) motor cover according to the related art. FIGS. 3A and 3B are perspective views illustrating an example of a terminal guide of the insulating structure of the power line terminal according to the related art. In particular, FIG. 3A is an example of a perspective view illustrating a front surface of the terminal guide and FIG. 3B is a perspective view illustrating a rear surface thereof. FIG. 4 is a perspective view illustrating an example of an insulating block of an insulating structure of the power line terminal according to the related art.

A method for fixing a motor terminal according to the related art will be described with reference to FIGS. 1 to 4. First, an insulating block 25 is manufactured by injection molding a terminal guide 20. Next, the motor cover 10 is assembled with the insulating block 25. Next, the motor cover 10 is assembled with the terminal guide 20. Next, the motor cover 10 is assembled with a high voltage three-phase connector. Finally, the high voltage three-phase connector is assembled with a motor coil terminal 90.

Further, the insulating structure of the power line terminal in the HSG motor according to the related art includes the insulating block 25 which is seated on an upper surface of the motor cover 10 to support the terminal guide 20 from below to allow the motor cover 10 and the terminal guide 20 to be spaced apart from each other. Further, the insulating block 25 has a structure in which an upper surface of the insulating block 25 is provided with a plurality of protrusions 26 which are fitted in a fixing bolt mounting hole of the terminal guide and the upper surface of the motor cover 10 is provided with a seating groove in which the insulating block 25 is seated while being combined with the motor cover.

As described above, according to the related art, the motor cover 10 and the terminal guide 20 supporting the power line terminal are spaced apart from each other without contacting each other due to the insulating block 25 and therefore even though moisture occurs due to a dew condensation phenomenon within the motor cover 10, the phenomenon that the power line is short circuited due to the moisture which is permeated into the terminal guide 20 side may be prevented and operation stability of the HSG motor may be improved.

However, when the terminal guide 20 is injection molded, the insert nut 30 fixing the high voltage three-phase wire connected to the motor is injection molded together. When the injection nut 30 is injection molded together with the terminal guide 20, the insert nut 30 is fixed to a mold of the terminal guide 20 and therefore an injection hole 21 is essentially perforated on a rear surface of the terminal guide 20. Therefore, the terminal guide 20 fixing the high voltage three-phase wire has an insufficient insulating distance from the motor cover 10 and when the space between the terminal guide 20 and the motor cover 10 is filled with foreign objects and moisture, the insulation of the HSG motor is broken and thus the motor is damaged. To prevent this, according to the related art, the insulating block (rubber material) 25 is additionally mounted on the rear surface of the terminal guide 20 to keep insulation.

However, to keep the insulating distance between the terminal guide 20 and the motor cover 10, adding a component like the insulating block 25 may increase the manufacturing costs and weight of the HSG motor.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Various objects and advantages of the present application can be understood by the following description, and become apparent with reference to the various described embodiments. It is obvious to those skilled in the art to which the present application pertains that the objects and advantages of the present application can be realized by the means as claimed, and combinations thereof.

In one general aspect, an apparatus for fixing a power line terminal may be provided to include a terminal guide configured to be mounted at one end of a motor cover to support a motor coil terminal and to have an upper surface provided with a plurality of insertion grooves, and a plurality of insert nuts configured to be inserted into the plurality of insertion grooves, the insert nuts manufactured separate from the terminal guide.

The apparatus may include a connector configured to fix upper surfaces of the plurality of insert nuts to prevent the plurality of insert nuts from being separated from the terminal guide when the plurality of insert nuts are inserted into the insertion grooves.

The apparatus may be configured such that a distal end of the connector is a plurality of bus bars.

The apparatus may be configured such that the plurality of insert nuts and the connector are assembled by fastening fixing bolts through central holes formed in the plurality of insert nuts and the connector, respectively.

The apparatus may be configured such that the terminal guide is formed with available spaces for tips of the fixing bolts coupled with the plurality of insert nuts.

The apparatus may be configured such that the plurality of insertion grooves and the plurality of insert nuts have a quadrangular shape.

The apparatus may be configured such that the three-phase connector and the motor coil terminal are coupled with each other on the plurality of insert nuts.

The apparatus may be configured such that the three-phase connector is first put on the plurality of insert nuts and the motor coil terminal is coupled with the three-phase connector while being put on the three-phase connector.

In another general aspect, a method for fixing a power line terminal may include manufacturing a terminal guide having an upper surface provided with a plurality of insertion grooves, manufacturing a plurality of insert nuts which are inserted into the plurality of insertion grooves, respectively, the manufacturing occurring while the insert nuts are separate from the terminal guide, mounting the terminal guide at one end of a motor cover to support a motor coil terminal, and inserting the plurality of insert nuts into the terminal guide.

The method may include fixing upper surfaces of the plurality of insert nuts by coupling a connector with the plurality of insert nuts so as to prevent the plurality of insert nuts from being separated from the terminal guide when the plurality of insert nuts are inserted into the insertion grooves.

The method may include a distal end of the connector as being a plurality of bus bars.

The method may include a process wherein the plurality of insert nuts and the connector are assembled by fastening fixing bolts through central holes formed in the plurality of insert nuts and the connector, respectively.

The method may include a process wherein the terminal guide is formed with available spaces for tips of the fixing bolts coupled with the plurality of insert nuts.

The method may include a process wherein the plurality of insertion grooves and the plurality of insert nuts have a quadrangular shape.

The method may include a process wherein the three-phase connector and the motor coil terminal are coupled with each other on the plurality of insert nuts.

The method may include a process wherein the three-phase connector is first put on the plurality of insert nuts and the motor coil terminal is coupled with the three-phase connector while being put on the three-phase connector.

Other features and aspects will be apparent from the following detailed description, the drawings, and the claims.

DETAILED DESCRIPTION

It is to be noted that technical terms used in the specification are used for describing specific embodiments and do not limit the present application. In addition, unless indicated otherwise in the specification, it is to be understood that all the technical terms used in the specification are construed as meaning as those that are generally understood by those who skilled in the art and as excessively comprehensive meanings and excessively reduced meanings. Further, the accompanying drawings are provided to easily understand the technical spirit of the present application disclosed in the present specification, and therefore the technical spirit is not limited to the accompany drawings. Therefore, it is to be construed that the accompanying drawings include all modifications and replacements included in the technical spirit and the technical scope disclosed in the present specification.

Hereinafter, an apparatus and a method for fixing a power line terminal in a motor according to embodiments of the present application will be described in more detail with reference to the accompanying drawings.

Figure 5:
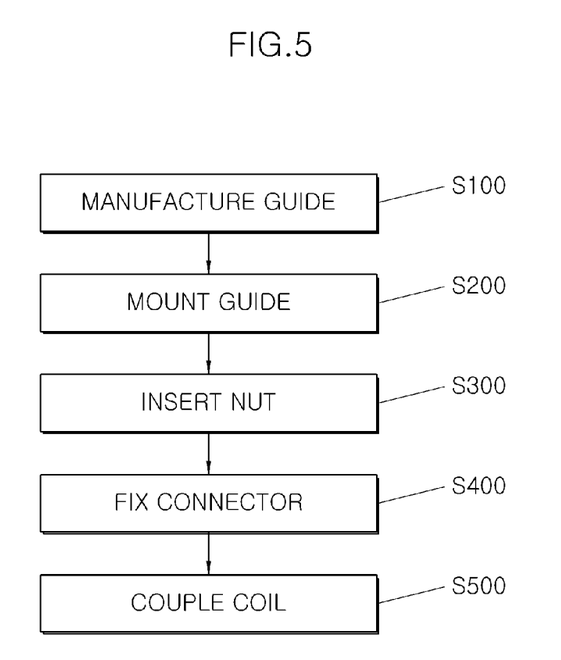
FIG. 5 is a flow chart illustrating an example of a method for fixing a motor terminal.
Figure 6:
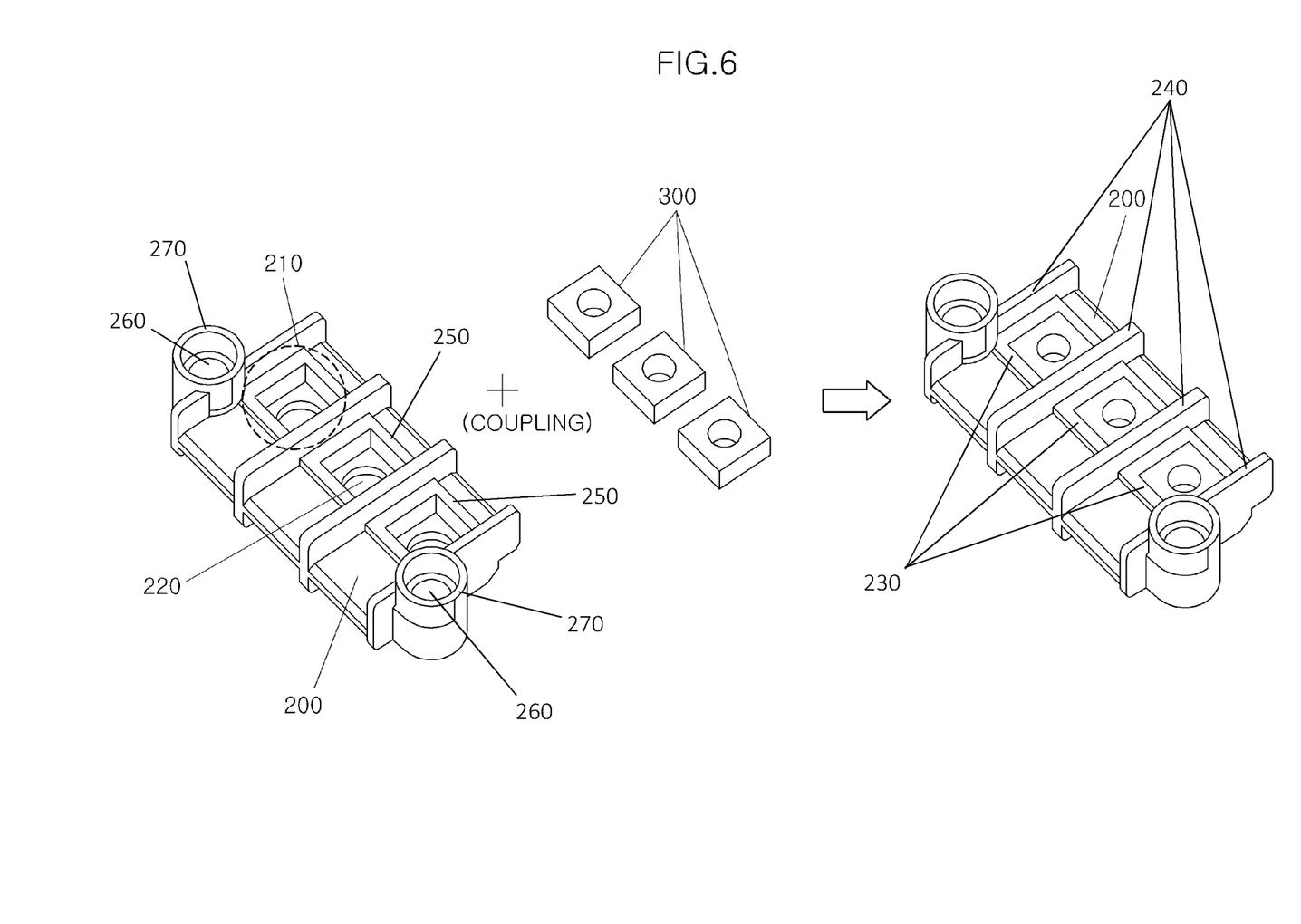
FIG. 6 is a perspective view illustrating an example of a nut inserting step in a method for fixing a motor terminal.
Figure 7:
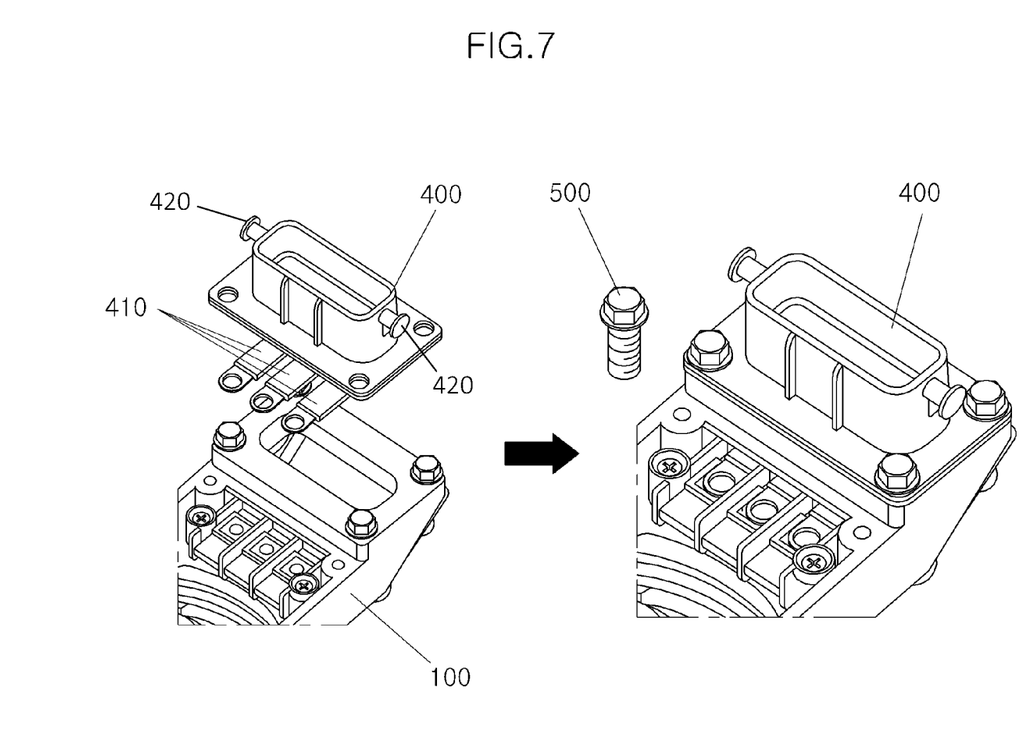
FIG. 7 is a perspective view illustrating an example of a connector fixing step in a method for fixing a motor.

FIG. 5 is a flow chart illustrating a method for fixing a motor terminal. FIG. 6 is a perspective view illustrating a nut inserting step in a method for fixing a motor terminal. FIG. 7 is a perspective view illustrating a connector fixing step in a method for fixing a motor terminal.

Referring to FIGS. 5 to 7, a method for fixing a motor terminal according to an embodiment of the present application may include manufacturing a guide (S100), mounting the guide (S200), inserting a nut (S300), fixing a connector (S400), and coupling a coil (S500).

In the manufacturing of the guide (S100), a motor terminal guide 200 having insertion grooves 210 into which insert nuts 300 may be inserted is manufactured. In the manufacturing of the guide (S100), the motor terminal guide 200 may be manufactured by injection molding. In this case, the motor terminal guide 200 is not injection molded together with the insert nut 300 but the motor terminal guide 200 is injection molded without an injection hole 21 and then may be injection molded to have an insertion groove 210 similar to an appearance of the insert nut so that the insert nut 300 may be inserted into the insertion groove 210. First lips 230 extend around the periphery of the insertion groove 210. Ribs 240 separate adjacent insertion grooves 210. Segments 250 connect adjacent ribs 240. The motor terminal guide 200 includes screw holes 260 having second lips 270.

It may be confirmed from FIG. 6 that the motor terminal guide 200 has three places provided with the appearance of the insert nut so that the motor terminal guide 200 may insert three insert nuts 300. In particular, the motor terminal guide 200 is not provided with the injection hole 21. Here, the motor terminal may be a Hybrid Starter Generator (HSG) motor terminal.

Further, in the manufacturing of the guide (S100), when the insert nuts 300 is coupled with fixing bolts 500, the motor terminal guide 200 may be formed with available spaces 220 for tips of the fixing bolts together with the insertion grooves 210 into which the insert nuts 300 may be inserted to prevent the fixing bolts 500 from penetrating through the motor terminal guide 200. That is, the motor terminal guide 200 may be injection molded to have a predetermined space 220 so as to prevent the tips of the fixing bolts 500 protruding to the other sides of the insert nuts 300 from penetrating through the motor terminal guide 200, after the fixing bolts 500 coupling bus bars 410 of the three-phase connector with the insert nuts 300 are coupled with the insert nuts 300.

In the mounting of the guide (S200), the motor cover 100 is mounted with the motor terminal guide 200. That is, in the mounting of the guide (S200), to form the insulating structure of the HSG motor terminal according to an embodiment of the present application, the insulating block is not mounted but the HSG motor cover 100 is directly mounted with the motor terminal guide 200.

The terminal guide 20 according to the related art is provided with the injection hole 21 of the insert nut 30 and therefore when the fixing bolt 50 is coupled with the insert nut 30, the tip of the fixing bolt 50 protrudes to the other side of the insert nut 30 through the injection hole 21. Further, to prevent a short from occurring due to a contact between the tip of the fixing bolt 500 and the motor cover 100 or an electrical connection between the tip of the fixing bolt 500 and the motor cover 100 due to foreign objects or moisture, the insulating block 25 is used.

However, according to the method for fixing a motor terminal in accordance with an embodiment of the present application, the motor terminal guide 200 is not provided with the injection hole 21 of the insert nut 300 and therefore the insulating block 25 is not required. Therefore, the motor cover 100 may be directly mounted with the terminal.

In the inserting of the nut (S300), the insert nut 300 is inserted into the motor terminal guide 200. That is, in the inserting of the nut (S300), the insert nut 300 is inserted into the insertion groove 210 into which the insert nut of the terminal guide without the injection hole 21 may be inserted. It may be confirmed from FIG. 6 that three insert nuts 300 are inserted into three places 210 within the terminal guide having the appearance of the insert nut. In this case, the three places 210 within the terminal guide is not provided with the injection hole 21. Here, the number of insert nuts 300 may be changed depending on the number of bus bars 410 which extend from the three-phase connector 400.

In the fixing of the connector (S400), the bus bar 410 of the three-phase connector is put on the insert nut 300 and the three-phase connector 400 is fixed to prevent the insert nut 300 from being separated out of the motor terminal guide 200. That is, in the fixing of the connector (S400), to press the three insert nuts 300 from above to fix the three insert nuts 300, the three bus bars 410 extending from the three-phase connector 400 are each positioned on the three insert nuts 300 and the three-phase connector 400 connected to the bus bar 410 may be separately fixed. The three-phase connector 400 includes protrusions 420.

By the above method, the insert nut 300 is pressed by the bus bar 410 and thus the insert nut 300 is fixed so as not to be separated out of the motor terminal guide 200. Here, the bus bars 410 of the connector may be provided with holes through which the fixing bolts 500 may be inserted into the insert nuts 300. It may be confirmed from FIG. 7 that the bus bar 410 of the three-phase connector is put on the insert nut 300 and then the three-phase connector 400 is fixed by a separate fixing means.

In the coupling of the coil (S500), a motor coil terminal 90 is coupled with the three-phase connector 400. That is, after the motor cover 100 is mounted with the motor terminal guide 200 and the insert nut 300 is inserted into the motor terminal guide 200, the three-phase connector is fixed to allow the bus bar 410 of the three-phase connector to press the insert nut 300 inserted into the terminal guide 400, and then, finally, in the coupling of the coil (S500), the bus bar 410 connected to the three-phase connector 400 is coupled with the motor coil terminal 90, which is fixed by the fixing bolt 500, thereby completing a motor assembly.

Hereinafter, the insulating structure of the motor terminal according to an embodiment of the present application will be described in more detail with reference to the accompanying drawings.

The insulating structure according to an embodiment of the present application may include the motor cover 100, the motor terminal guide 200, the insert nut 300, the three-phase connector 400, the fixing bolt 500, and the motor coil 90.

The motor cover 100 may be mounted with the motor terminal guide 200, the insert nut 300, the three-phase connector 400, the fixing bolt 500, and the motor coil terminal 90.

The motor terminal guide 200 is mounted on the motor cover 100, while having the available space 220 for the insertion groove 210 into which the insert nut 300 may be inserted and the tip of the fixing bolt 500 coupled with the insert nut 300. In particular, the motor terminal guide 200 may be manufactured by injection molding. In this cast, the motor terminal guide 200 is injection molded without the injection hole and may be injection molded to have the insertion groove 210 into which the insert nut 300 may be inserted. Further, the motor terminal guide 200 may be injection molded to have a predetermined space 220 so as to prevent the tip of the fixing bolt 500 protruding to the other side of the insert nut 300 from penetrating through the motor terminal guide 200, after the fixing bolt 500 coupling the insert nut 300 with the bus bar 410 of the three-phase connector is coupled with the insert nut 300.

Here, the number of available spaces 220 for the insertion grooves 210 into which the insert nuts 200 may be inserted and the number of tips of the fixing bolts may be changed depending on the number of bus bars 410 which extend from the three-phase connector. It may be confirmed from FIG. 6 that the motor terminal guide 200 has three places provided with the insertion groove 210 into which the three insert nuts 300 may be inserted. Here, the motor terminal guide 200 is not provided with the injection hole 21.

The insert nut 300 is inserted into the motor terminal guide 200. In more detail, the insert nut 300 is inserted into the insertion groove 210 into which the insert nut of the motor terminal guide 200 may be inserted. In this case, the number of insert nuts 300 may be changed depending on the number of bus bars 410 which extend from the three-phase connector 400.

The three-phase connector 400 has the bus bar 410 and the bus bar 410 is put on the insert nut 300 to prevent the insert nut 300 from being separated out of the motor terminal guide 200. That is, the three-phase connector 400 may have the bus bar 410 which may be put on an upper end of the insert nut 300. Further, to connect the bus bar 410 to the motor coil terminal 90, the bus bar 410 is coupled with the insert nut 300 by the fixed bolt 500, and as a result, the three-phase connector 400 may be electrically connected to the motor coil terminal 90. Here, the bus bar 410 of the connector may be provided with the hole through which the fixing bolt 500 may be inserted into the insert nut 300.

The fixing bolt 500 is coupled with the insert nut 300 to electrically connect the bus bar 410 of the three-phase connector to the motor coil terminal 90. The motor coil terminal 90 may be connected to the three-phase connector 400 to drive the motor.

According to the apparatus and method for fixing a power line terminal in a motor in accordance with an embodiments of the present application, it is possible to improve the insulating performance between the terminal guide and the motor cover without using the insulating block.

Further, according to the apparatus and method for fixing a power line terminal in a motor in accordance with embodiments of the present application, it is possible to delete the insulating block to reduce the number of parts, the weight and the material costs, and the assembling man hour of the insulating block.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure

What is claimed is:

1. An apparatus to fix a power line terminal, the apparatus comprising:
a terminal guide configured to be mounted at an end of a motor cover to support a motor coil terminal, and comprising
three depressions in an upper surface of the terminal guide,
first lips extending around peripheries of the depressions,
ribs separating adjacent depressions among the depressions, and
screw holes comprising a second lip and a first stepped interior, disposed at opposing ends of the terminal guide, and oriented parallel to a first central through hole; and
three nuts respectively inserted into the three depressions,
wherein a polygonal shape of the peripheries of the depressions corresponds to a polygonal shape of peripheries of the nuts such that the nuts are rotationally constrained within the depressions,
wherein respective center points of each of the nuts are collinear,
wherein the nuts and the terminal guide are separately formed,
wherein the first lips are level with top surfaces of the nuts, and comprise segments connecting adjacent ribs among the ribs, and
wherein boundaries of the screw holes respectively extend from outer ribs among the ribs.

2. The apparatus of claim 1, further comprising:
a connector configured to fix the top surfaces of the nuts to prevent the nuts from being separated from the terminal guide when the nuts are respectively inserted into the depressions.

3. The apparatus of claim 2, wherein the connector comprises bus bars disposed at a distal end of the connector.

4. The apparatus of claim 2, wherein the nuts and the connector are assembled by fastening bolts through first central holes formed in the nuts and second central holes formed in the connector.

5. The apparatus of claim 2, wherein the terminal guide is formed with spaces configured to accommodate tips of the bolts, which are coupled to the nuts.

6. The apparatus of claim 1, wherein the polygonal shape the peripheries of the nuts is a quadrilateral.

7. The apparatus of claim 1, wherein a three-phase connector and the motor coil terminal are coupled by the nuts.

8. The apparatus of claim 7, wherein the three-phase connector is disposed on the nuts, and the motor coil terminal is coupled to the three-phase connector.

9. The apparatus of claim 1, wherein
each of the nuts comprises the first central through hole,
each of the depressions comprises a second central through hole,
the first central through hole is concentrically aligned with the second central through hole, and
the ribs extend perpendicular to the first central through hole.

10. The apparatus of claim 9, wherein the segments extend perpendicular to the ribs.

11. The apparatus of claim 10, further comprising a connector comprising
a flat base comprising base holes in each corner of the base,
bus bars extending from the base and comprising bus bar holes,
a wall extending from the base and forming a closed loop, and
structural reinforcements connecting the base to the wall, and
protrusions extending in opposite directions from the wall,
wherein the bus bars are level with each other and parallel to each other,
wherein the wall comprises a second stepped interior, and
wherein the bus bar holes are spaced so as to be aligned with the first central through holes.

12. The apparatus of claim 11, wherein
the terminal guide is integrally formed, and
the first stepped interior and the second stepped interior are stepped in a same direction.

13. A method to fix a power line terminal, the method comprising:
manufacturing a terminal guide comprising
three depressions in an upper surface of the terminal guide,
first lips respectively extending around peripheries of the depressions,
ribs separating adjacent depressions among the depressions, and
screw holes comprising a second lip and a first stepped interior, disposed at opposing ends of the terminal guide, and oriented parallel to a first central through hole;
manufacturing three nuts separately from the terminal guide;
respectively inserting the three nuts into the three depressions; and
mounting the terminal guide at an end of a motor cover to support a motor coil terminal,
wherein a polygonal shape of the peripheries of the depressions corresponds to a polygonal shape of peripheries of the nuts such that the nuts are rotationally constrained within the depressions,
wherein respective center points of each of the nuts are collinear,
wherein the first lips are level with top surfaces of the nuts, and comprise segments connecting adjacent ribs among the ribs, and
wherein boundaries of the screw holes respectively extend from outer ribs among the ribs.

14. The method of claim 13, further comprising:
fixing the top surfaces of the nuts by coupling a connector to the nuts so as to prevent the nuts from being separated from the terminal guide.

15. The method of claim 14, wherein the connector comprises bus bars at a distal end of the connector.

16. The method of claim 14, wherein the nuts and the connector are assembled by fastening bolts through first central holes formed in the nuts and second central holes formed in the connector.

17. The method of claim 14, wherein the terminal guide is formed with spaces to accommodate tips of the bolts, which are coupled to the nuts.

18. The method of claim 14, wherein the polygonal shape of the peripheries of the nuts is a quadrilateral.

19. The method of claim 13, wherein a three-phase connector and the motor coil terminal are coupled by the nuts.

20. The method of claim 19, wherein the three-phase connector is placed on the nuts, and the motor coil terminal is coupled to the three-phase connector while being placed on the three-phase connector.

\* \* \* \* \*